Dec. 19, 1967  P. J. BOCKENSTEDT  3,358,475
PHOTOFLASH LAMP

Filed Aug. 10, 1965  3 Sheets-Sheet 1

INVENTOR.
PAUL J. BOCKENSTEDT
BY Marshal, Biebel, French & Bugg
ATTORNEYS

Dec. 19, 1967  P. J. BOCKENSTEDT  3,358,475
PHOTOFLASH LAMP
Filed Aug. 10, 1965  3 Sheets-Sheet 2

Dec. 19, 1967   P. J. BOCKENSTEDT   3,358,475
PHOTOFLASH LAMP

Filed Aug. 10, 1965   3 Sheets-Sheet 3

United States Patent Office 3,358,475
Patented Dec. 19, 1967

3,358,475
PHOTOFLASH LAMP
Paul J. Bockenstedt, P.O. Box 175, North Dayton Station, Dayton, Ohio 45424
Filed Aug. 10, 1965, Ser. No. 478,629
19 Claims. (Cl. 67—31)

It has long been known that fine metallic wires, foils, or powders, will, when immersed in a suitable atmosphere and raised above critical temperature, ignite and chemically react so that large amounts of light and heat are rapidly liberated, the reactions, once started, continuing without need of further external stimulation until such time as one or both reactants are expended, or the temperature falls below the critical point.

Such chemical recations are utilized in the ordinary flash lamp. These lamps typically contain fine aluminum, magnesium or aluminum-magnesium alloy wire or foil confined in a glass bulb in a pure oxygen gas atmosphere. Electrical conductors are provided which lead to a fine resistive igniting filament, which, when triggering is initiated with electric current from an external battery or power source, is literally exploded by joule heating and oxidation. The heat and shock from the exploding igniting filament ignites an explosive paste consisting of combinations of metallic powders and oxidizing agents disposed in close proximity with the igniting filament. The explosive paste ignites and produces sufficient heat to ignite the main reaction between the wire or foil and the gas atmosphere.

Once so initiated, the reaction proceeds to completion in a period of time amounting to a fractional part of a second, and the visible light which is the generally desired and useful output of such a lamp reaches such high intensity that large areas may be illuminated sufficiently to permit photographs to be made in the absence of any other light source.

Variations of the above lamps include use of plastic containers to replace the glass bulb, as well as internal or external reflectors, and means for releasing the gas reactant immediately prior to the use of the lamp.

All the aforementioned photoflash lamps have certain limitations which are well known to both the amateur and professional photographer.

Foremost among these limitations is the poor form factor of the rigid glass bulb of the present practical photoflash lamp which makes it difficult and inconvenient to carry quantities of such lamps in pockets of clothing worn by the photographer, or to store such lamps generally. In addition, these glass bulbs are fragile, and because the exothermic reaction which is initiated raises pressure to several standard atmospheres pressure within the rigid glass structure, such photoflash lamps often explode and scatter fragments creating hazards to bystanders, or to the photographer himself.

Prior art glass photoflash lamps require the use of an external reflector to direct light toward the preferred area being illuminated. If this were not done a large fraction of the light produced would be lost. Such reflectors are so arranged that the lamp is disposed near the focal point of the reflector, which assumes a parabolic shape. Such reflectors are bulky and cumbersome and defeat the purpose of portability and compactness desired in modern photographic equipment.

The manufacture of conventional photoflash lamps with rigid glass bulbs also requires the use of expensive machinery, tending therefore to restrict manufacture of such lamps to those companies having resources adequate for financing the large investment in capital equipment which is required.

All lamps utilizing plastic envelopes in accordance with previous art as represented by United States Patents 2,277,482; 2,273,435; and 2,254,888, and British Patents 463,168 and 439,008 fail to contain and confine material products of the exothermic reaction and accordingly are hazardous to use in proximity with inflammable materials or atmospheres.

Another limitation present in lamps utilizing plastic envelopes, relates to shelf life due to gaseous and moisture permeability of the plastic material envelope. Due to variations in pressure between the external atmosphere and internal gas reactant caused by changes in climate, altitude, or proximity to heated surfaces of the flash lamp, the enclosed gas reactant is lost to the external atmosphere, and moisture and air enter the flash lamp. This condition is aggravated by the deliberate use of pressure differences between the ambient atmosphere and the gas contained within the lamp to indicate whether the lamp has maintained its sealed condition or has been used.

A further limitation of all the present photoflash lamps in current use, or suggested in literature is the requirement for an external source of electric current, such as a battery, or power supply, to trigger the reaction. Such batteries, power supply, or battery-charging units are bulky and troublesome because of variable levels of output resulting from shelf life, discharged condition, multiplicity of electrical connections.

Different from the conventional photoflash lamps where poor form factor, rigid structure, and inefficient use of light output give rise to the above limitations and others not mentioned, the novel photoflash lamp of this invention eliminates these limitations by means of a flexible structure which reliably contains and confines the exothermic chemical light producing reaction.

In simple terms, the photoflash lamp of this invention may consist of a flexible or semi-rigid hermetically sealed transparent plastic structure enclosing a refractor or a reflector shaped to efficiently project light in a preferred direction and area, selective color filter, reacting agents such as foil, wire, powders, gases or combinations thereof, electrical conductors connecting an igniting filament either to an internally disposed battery or to exposed contacts for connection to an external battery and a camera synchronizing switch, explosive paste to trigger the main reactants, and ablating and insulating coatings or sheets to prevent perforation of the container by the exothermic reaction. The invention thus described comprises overall an improved photoflash lamp for utilizing, confining light emitting chemical reactions, and is intended in particular to assist in making photographs by supplying adequate light to stimulate photographic emulsions where normal ambient light is insufficient, and to make the use of such a lamp safe, convenient, reliable and inexpensive.

Accordingly, it is an object of this invention to provide a flat form photoflash lamp which will allow efficient and compact packaging for storage and shipment.

It is a further object to provide a flexible or semi-rigid structure for photoflash lamps which will permit the user to comfortably carry such lamps in the pockets of his usual street clothing.

It is a further object to provide a photoflash lamp which does not require use of a separate reflector apparatus, but one which has a reflector which forms an integral part of the photoflash lamp itself.

It is also an object to provide means for shaping this reflector to permit light to be projected in a preferred direction and area.

It is a further object to provide a photoflash lamp which is an effective area light emitter as constrasted with the point source bulb so as to eliminate or reduce sharp shadow contrasts.

It is an important object to provide an entirely self contained photoflash lamp with an integral source of electric current, so as not to require additional external batteries, power packs, excepting the contact lead connecting the camera shutter switch to the electric circuit.

It is an important object to provide a photoflash lamp which may be manufactured by inexpensive capital equipment.

It is an important object to provide a photoflash lamp with a flexible or semi-rigid plastic envelope, protected against damage from shock or vibration by its physical properties, which will reliably hermetically confine a light producing exothermic chemical reaction and contain the material by products thereof inside the lamp envelope with no contact with the external atmosphere or external objects.

It is an important object to provide a photoflash lamp wherein internal and external atmospheric pressures will remain constantly identical over wide ranges of ambient barometric pressure and altitude variation so that the gaseous permeability of the container material will not contribute to deterioration or loss of the reactants.

These and other objects and advantages of the invention will be apparent from the following description, the accompanying drawings and the appended claims.

Figure 1:
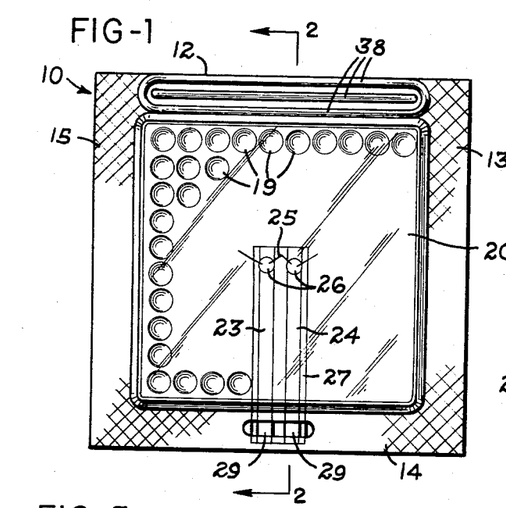
FIG. 1 is a plan view of one embodiment of a flexible photoflash lamp constructed according to this invention.
Figures 2, 4:
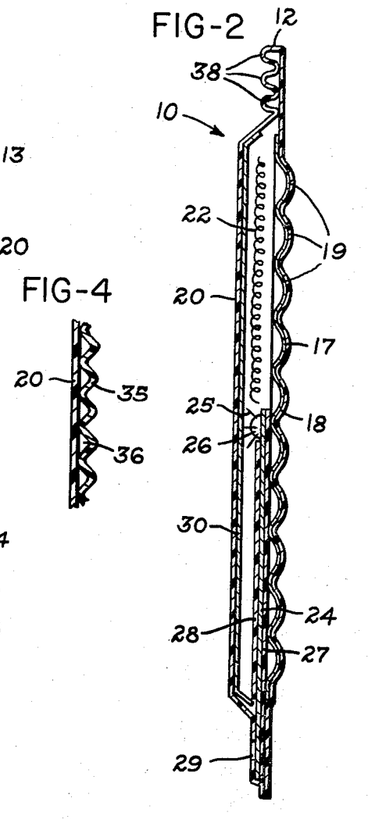
FIG. 2 is a sectional view of the photoflash lamp of this invention taken along line 2—2 in FIG. 1.
FIG. 4 is a cross sectional view of a portion of the front surface of the flash lamp container showing one embodiment of the container protective shield.

Reference is now made to FIGS. 1 and 2, which show one embodiment of a sealed flexible photoflash lamp constructed according to this invention. A hermetically sealed outer envelope or container 10, constructed from a transparent plastic material such as polyvinyl chloride, Mylar, polyvinyl acetate, or cellulose acetate, houses the flexible photoflash lamp of this invention. This container may be formed from a single sheet of material which is folded at 12, as shown in FIG. 2, and sealed along the remaining edges 13, 14 and 15, either by fusion or through the use of a suitable cement.

A reflective surface 17 may be attached to the internal rear surface 18 of container 10. The surface 17 may be either flat or shaped in the form of a single parabola or shaped with a plurality of parabolic indentations 19, as illustrated in FIG. 2, in order to direct the light produced in the photoflash lamp in a preferred direction. The front surface 20 of container 10 may be formed as shown in FIG. 2 to accommodate the reactants which are used to produce the light producing exothermic reaction.

A quantity of fine aluminum magnesium alloy wire 22 is positioned within the space between the front and rear surfaces of the container. This wire when raised above its critical ignition temperature, will react continuously with a quantity of oxygen gas which is confined within the container until either the gas or the wire is expended. In order to raise the wire 22 to the critical ignition temperature, a pair of electrical conductors 23 and 24 extend into the interior of the container 10 along the back surface. An igniting wire or filament 25 is connected across the electrical conductors and explosive primer paste is deposited at 26 where the ignition wire joins each of the conductors. An insulating strip 27, which may be constructed of the same material that forms the container, is placed between each of the electrical conductors and the reflective surface 17. A further insulative strip 28 is placed between the strips 23 and 24 and the wires 22. The other end of each of the electrical conductors extends to the exterior surface of the envelope where they are accessible as at 29 for the application of an igniting current.

The reflective surface 17 in the present invention may be flat, or in the shape of a single parabola, or shaped with a plurality of parabolic surfaces 19. The pattern of light which is reflected from a flat reflective surface is essentially hemispherical in shape and consequently much of the light is unuseable for photographic purposes. Providing a parabolic reflective surface permits much of the light which is produced within the sealed envelope to be focused in a preferred direction.

By providing a plurality of reflectors 19, each of which are parabolic in cross section, as shown in FIG. 2, the light is effectively directed toward a preferred area. The focus of each reflector 19 shape falls inside the lamp on an imaginary plane passing through the center of the reaction. Thus, by careful positioning of the focus of the reflectors, the light produced is projected by the combined action of all the reflector shapes as if the light were emitted from an area source, thereby eliminating harsh shadows which are present when using point source lamps with a single reflector.

Figures 3, 6, 7, 8:
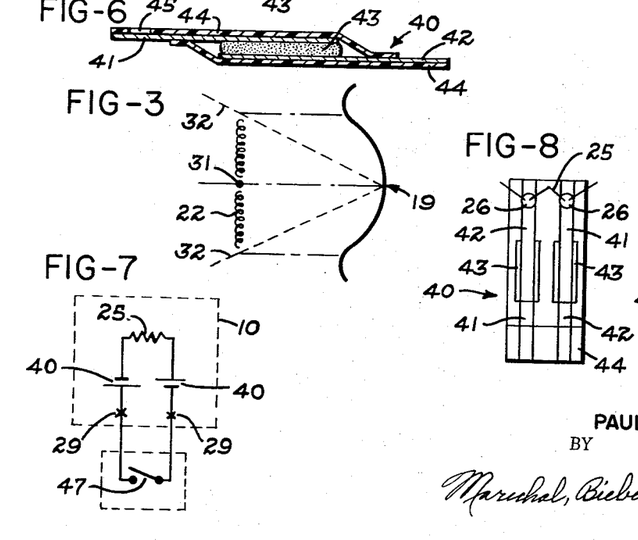
FIG. 3 is an enlarged view of a single parabolic reflector of FIG. 2 and a portion of the reactant material showing the light ray pattern formed during the reaction.
FIG. 6 is a sectional view of the tape battery taken along line 6—6 in FIG. 5.
FIG. 7 is a schematic electrical diagram showing the operation of one embodiment of the photoflash lamp using internal tape batteries.
FIG. 8 is a plan view of an ignition sub-assembly using a pair of tape batteries and showing an igniting filament wire in series with the batteries.

FIG. 3 shows, on an enlarged view, the light ray pattern which will be emitted during the light producing reaction from the reactants within the sealed flexible container. By positioning the reactant wire 22 at the focal plane passing through focus 31 of the parabolic reflector 19, the light produced will be projected in a diverging solid conical shaped pattern defined by and contained within the dotted lines 32. By varying the equation and shape of parabolic indentation, the solid angle of illumination can be controlled.

The photoflash lamps of prior art which have utilized thin flexible plastic containers have not achieved reliable confinement of the material products of the light producing reaction. In the prior art lamps, as the reaction reaches a very high temperature, molten metal droplets are formed and which by virtue of high kinetic and thermal energy perforate the container material exposing such droplets to the external environment. If the surroundings include inflammable material, or explosive atmospheres, such lamps are extremely hazardous to use.

Pressures internal to the photoflash lamp with plastic containers which are flexible never reach the high values which occur inside the rigid glass bulb type photoflash lamp. This is because the former types possess the ability to yield to the expanding gases within the package, and since the exothermic reaction is of brief duration, the maximum deflection needed to accommodate the pressure impulse can easily be achieved in a properly designed flexible plastic container. However, the thin form factor, which is preferred for convenience sake, and the property of being readily flexible aggravate the thermal effect, so that lack of fragmentation is achieved at the expense of reliable confinement, and the danger of igniting external combustible materials with such lamps is increased over the conventional glass bulb lamp.

The apparatus of this invention differs from prior art glass photoflash lamps which confine the material products of the light producing reaction at the expense of being a hazard due to fragmentation, and from plastic container lamps of prior art which avoid the fragmentation hazard but fail to confine the reaction products, by providing both reliable confinement and non-fragmenting characteristics in a flexible plastic structure of preferred form factor.

The thin thermoplastic material which forms the container envelope may be protected by a variety of other materials utilizing several different protective mechanisms. Some of these other materials serve the dual function of both protecting the container from destruction from the extremely hot reaction products, and by acting as a light filter, a light refractor or a light reflector.

Mounted adjacent the front surface 20 of the container 10 is a light filter 30, which may be constructed of a plastic material, which is used both as a spectrally selective filter and acts as an envelope protective means by mechanically shielding the envelope and by absorbing the high peak value of the heat impulse generated by the exothermic reaction and thereby causing the heat energy to be released over a more extended period of time at levels consistent with the physical properties of the container material. The protective properties of the filter 30 may be due to its heat ablative properties which protect the container envelope by absorbing the heat from the reaction products by melting at a temperature lower than the melting temperature of the container material, or by its insulative properties by providing a material having a low coefficient of thermal conductivity to delay heat passage or by mechanically shielding the envelope material from direct contact with the energetic metal droplets created during the light producing reaction which would otherwise melt and perforate the envelope. This filter and protective layer 30 is essentially a flat sheet which does not require the thin cross section needed for the flexible exterior container material.

When refractive properties are desired in this filter layer, for example to diffuse light for photographic effect, glass fibers may be embedded in the material either randomly or in an ordered pattern, or by crinkling the material as shown in FIG. 4. The filter layer may also constitute, by virtue of appropriate groovings or moldings, a suitable Fresnel lens arrangement and when used in combination with a flat reflector projects the light generated by the exothermic reaction in a preferred direction. In general, gas will comprise an additional protective layer 36 separating the face 20 of the container 10 from the filter layer 35. This gas layer 36, by virtue of its low thermal conductivity, affords further insulative protection to the container material.

The filter and envelope protecting material 30 may also consist of thermally resistant material of sufficient mass which is spray deposited on the front surface 20 of the container. This material, such as a layer of glass beads, would mechanically protect the envelope and also provide a degree of thermal isolation between the thermal plastic envelope and the hot reaction products.

The filter and heat ablative material 30 may be colored, if desired, either by dyeing the material or by coating it with a suitable colored film. It is also possible to use a separate color filter placed between a clear transparent heat ablative material and the front inner surface 20 of the container 10. A further method of altering the color output of the photoflash lamp would be to utilize a colored outer envelope 10 and a clear transparent heat ablative material 30.

The reflector metal foil 17, which may be a separate sheet of foil or may be a metal, such as aluminum, deposited on the rear surface 18 by a vacuum process, functions in a different manner than the filter layer 30. Thus, by reflecting heat and light energy away from the rear surface 18 of the container, by rapidly conducting heat away from a hot spot resulting from contact with hot reactants and thereby extending the area over which the heat is applied to the container material, and by providing sufficient high temperature tensile properties to destroy the momentum of sputtering droplets of metal which are projected toward the rear of the container, the reflective surface thereby effectively prevents perforation of the rear wall of the plastic container by the hot reaction products.

By this unique combination of materials of differing properties, reliable containment of an exothermic reaction between chemical reactants is achieved, and hermetic confinement of the material products of the exothermic reaction during and after said reaction ceases is made possible, even though the temperature of the reaction is so high as to otherwise tend toward destruction of the container material.

The material which is chosen for the outer envelope or container for the photoflash lamp should be of such a nature that when the reaction products contained within the lamp are ignited, it will yield to the momentary pressure created during the reaction without rupturing.

Since a difference in pressure between the ambient atmospheric pressure and the internal pressure of the photoflash lamp will cause diffusion of the gas contained within the lamp to the atmosphere to allow moisture in the atmosphere to penetrate into the lamp, it is necessary to provide that the internal pressure of the lamp be maintained at exactly ambient atmospheric pressure.

The most serious difficulty encountered in using plastic materials for the outer envelope relates to the permeability of a plastic container to gases and water vapor. Such permeability may be described as the tendency of a gas or water vapor to pass through a barrier wall of the plastic material, the total amount being proportional to the absolute and partial pressure differential existing across the barrier, the period of time involved, and a factor peculiar to the specific type of material under consideration.

The photoflash lamps of the prior art which utilize glass containers have demonstrated good shelf life because they are virtually non-permeable to the reactant gas, or to moisture or water vapor over the range of environmental conditions experienced by such a lamp. This desirable characteristic is achieved however, by use of a relatively fragile, rigid glass structure, at the expense of safety of use.

In contrast, the photoflash lamp of other prior art devices having flexible plastic or semi-rigid plastic structures have been for the most part impractical because of the permeability of the container materials available even to the present time. The permeability characteristic results in a gradual loss of the preferred gas reactant to the external atmosphere when the photoflash lamp experiences conditions where internal absolute, or partial pressures exceed those of the external environment, or dilution of the reactant gas when external pressure exceeds the internal pressure of the photoflash lamp.

Unless otherwise protected by additional external, impervious housings, such as may be made of metals, these prior art flexible lamps, when subjected to variations of pressure and water vapor of the natural ambient atmosphere, will "breathe" with resulting loss of the gas reactant, with deteriorations of the chemical reactant, and giving a very short shelf life characteristic to the lamp.

Different from such prior art devices, this invention employs a mechanism to effectively maintain an identical pressure between the internal contents and the external pressure environment of the atmosphere. Under such conditions, the influence of the permeability characteristic of the plastic material is reduced to a negligible value since the transport of gas or vapor is directly proportional to the pressure across the barrier wall, which, in this invention, is reduced to near zero value.

As shown in FIGS. 1 and 2, a series of folds 38 are provided in bellows like fashion in the envelope 10 constituting the container for the photoflash lamp unit. Thus, as ambient atmospheric pressure changes, the gas contained within the lamp is allowed to expand or contract and to maintain identity of pressure. These folds 38, although shown only on one side of the container 10, could surround the entire container to allow for greater sensitivity to pressure changes.

Other photoflash lamps having plastic containers have been described which utilize, deliberately, pressure differences to give indication of lamp condition, however, such pressure differences imply either semi-rigid structures in total, or at least in sections for support of thin flexible sections in tension so that said pressure differential may be maintained. However, the existence of such pressure differences itself defeats the shelf life requirement and such lamps are completely impractical for this reason, that they aggravate the diffusion problem.

As a general consideration, the broad surface area of the flat form factor photoflash lamp also aggravates the effects of permeability of the plastic material since the amount of loss of gas reactant, or influx of diluting elements is directly proportional to the total area of the surface. In this invention, the disposition of elements, in particular, the internal reflector 17, is such as to provide an impervious metal barrier wall for half the exposed surface of the photoflash lamp. This obviously reduces the effects of permeability by a factor or two.

Figure 5:
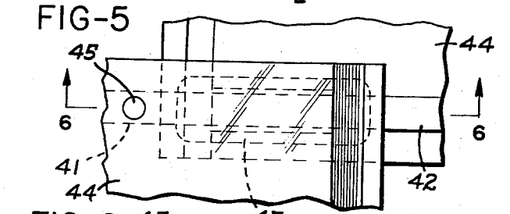
FIG. 5 is a plan view of a tape battery for use in the interior of the photoflash lamp of this invention.

Reference is now made to FIGS. 5 and 6 which show an integrated dry cell battery or energy cell which may be included within the envelope 10 of the improved photoflash lamp of this invention. By providing a single use energy cell with each photoflash lamp, the requirement for an external source of power to initiate the triggering of the light producing reaction is eliminated. As is well known, these prior art external battery packs or power supplies are bulky and quite heavy.

Since only a single reaction is to be triggered with a battery incorporated within the envelope 10 of this invention, a small capacity battery 40 may be used. The battery 40 may be constructed with existing conductor strips of a flexible printed circuit or supporting base structure forming suitable dissimilar metal electrodes, separated by a porous electrolyte carrying medium. In one embodiment of the dry cell constructed according to this invention, the anode element or negative electrode 41 is zinc or zinc plated conductor of a printed circuit while the cathode element or positive electrode 42 is a strip of dag or dag coated conductor of a printed circuit.

Separating the electrodes 41 and 42 is a porous paper medium 43 impregnated with an electrolyte, such as ammonium chloride and with depolarizing and other additive chemicals. Manganese dioxide is used as the depolarization material in this embodiment of the invention, while the addition of zinc chloride in the paper medium serves to improve the performance and shelf life characteristics of the battery.

As an alternative arrangement, a pair of copper conductors may be used which are coated with suitable, dissimilar electrode materials. The porous medium may be formed from two or more separate porous paper strips, one containing the electrolyte and the other being impregnated with the depolarization and additive materials may be joined together to form the porous medium 43 separating the electrodes. Of course, the invention is not limited to these specific elements for use as electrodes or to the chemicals described as being useful as the electrolyte, depolarizing and additive materials.

The cell 40 is held together by electrically insulating mechanically supporting plastic tapes 44 which are part of the existing printed circuit. These tapes may consist of thin sheets of plastic which may be either coated with a pressure sensitive adhesive compound or be capable of being sealed by heat fusion means. By constructing the battery covering 44 from a thermoplastic material, adequate moisture is retained within the cell and any hydrogen which may ge generated within the cell may readily pass through the plastic cover and thereby prevent a buildup of gas and the formation of gas bubbles within the cell. An opening 45 may be provided in one insulating cover 44, as shown in FIG. 5, to permit an electrical connection to be made through the plastic tape to anode 41.

Referring now to FIG. 7, a pair of battery cells 40 are shown schematically within the envelope 10. An ignition wire 25 connects the cathode of one energy cell to the anode of the other energy cell. Connected to the exterior contacts 29 is a switch 47, which may be the switch inside the shutter mechanism of a camera. When the switch 47 is closed, heating of the ignition wire and initiation of the exothermic reaction inside the envelope 10 occurs.

Figure 9:
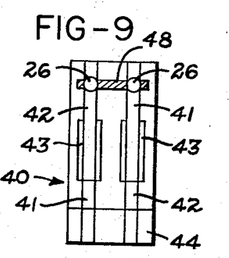
FIG. 9 is a plan view of another embodiment of an ignition sub-assembly employing a thin film ignition element and using a pair of tape batteries.

FIGS. 8 and 9 both show an ignition sub-assembly wherein a pair of integrated batteries 40 are mounted on an insulating base. An ignition wire 25 (FIG. 8), which may be constructed of a fine tungsten wire, connects the cathode of one battery to the anode of the other battery. An explosive primer paste 26, which may consist of zirconium, magnesium, or aluminum powder combinations with oxidants such as potassium perchlorate, finely ground and mixed in a paste with nitrocellulose as a binding and agglutinating agent, is deposited on the anode and cathode elements at the point where the igniting wire 25 is attached.

The ignition wire, as shown in FIG. 9, may also be a thin metal film resistor 48 which may be vacuum deposited across the anode and cathode conductors. The thin metal igniting film 48 is especially adapted for rough handling of the flexible package and may be preferred for such application.

The pair of batteries 40 shown in FIGS. 8 and 9 may be constructed by taking a single strip of plastic tape 44 and placing thereon a pair of electrodes, one comprising the anode element 41 while the other comprises the cathode element 42. This strip is then cut transversely so that an identical pair of strips is formed. One strip is oriented and placed over the other strip so that the anode and cathode elements of one strip is opposite the cathode and anode elements, respectively, of the other strip. The porous medium 43 containing the electrolyte and other additive materials is placed between each pair of electrodes before the tape is sealed together and to the conductors. In this manner, a pair of batteries can be easily and inexpensively manufactured which serve as both the energy source for the photoflash lamp and as the conductor element between the igniting filaments and the exterior surface of the sealed photoflash lamp.

Figure 10:
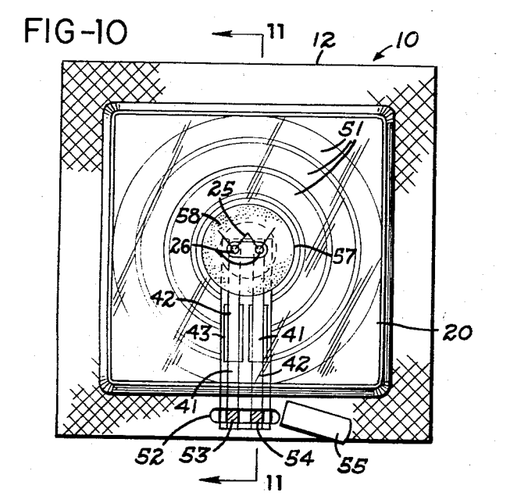
FIG. 10 is a plan view of a hermetically sealed flexible photoflash lamp using a mixture of solid reactants and having a reflector composed of a plurality of concentric troughs of parabolic cross section.
Figure 11:
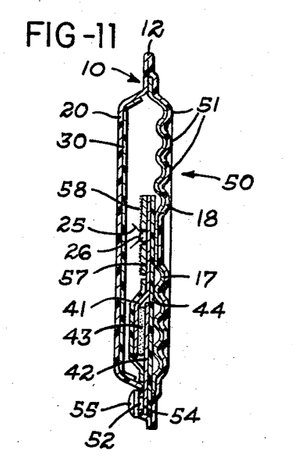
FIG. 11 is cross sectional side elevational view taken along line 11—11 in FIG. 10.

FIGS. 10 and 11 show another embodiment of this invention where solid reactants are used and wherein the gas fill is inert, such as nitrogen gas, and where the shaped reflective surface consists of a plurality of circular troughs or parabolic shape in cross section.

Pressure equilibrium between the gas contained within the flexible envelope and the ambient atmospheric pressure is maintained through the use of a bellows 50 formed by a plurality of concentric troughs 51 of parabolic cross section which also serves as the shaped reflector of the lamp.

In this embodiment of the invention, a pair of batteries 40 is shown contained within the sealed envelope. Extending to the exterior of the envelope 10 at opening 52, while maintaining the envelope sealed, is a pair of electrical conductors 53 and 54 which form the cathode element of one battery and the anode element of the other battery. Short circuiting these two electrodes will cause the light producing means contained within the lamp to be ignited. In order to prevent shorting of these conductors by inadvertent accidental contact of metal objects, an insulating tape 55 provided with a pull tab normally covers the opening 52.

A thin transparent disc 57, which may be constructed from cellulose nitrate film, supports the mixture of the main solid reactants 58 centrally in the flash lamp. The solid reactants may comprise a finely ground mixture of magnesium powder and potassium perchlorate proportioned to achieve the desired period of illumination. The disc 57 is positioned in the center of the envelope and has mounted thereon the electrical conductors from the batteries 40, the igniting wire 25 and the explosive paste 26.

The neutral or inert gas, such as nitrogen, which has a very low rate of diffusion through the container wall, fills the interior of the envelope. Since the nitrogen has a low rate of diffusion, shelf life of flash lamps using this type of gas fill will be increased since the interchange of moisture laden ambient air and fill gas will be slower than when other types of gas are used. In addition, since all the reactants are a mixture of solid materials, there will be no dilution of a gas reactant atmosphere due to diffusion.

Figure 12:
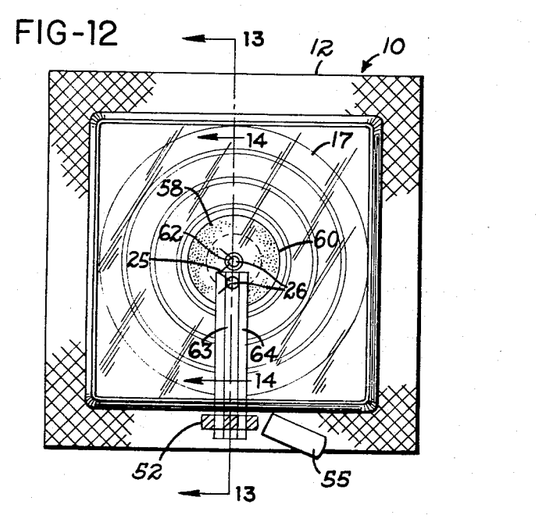
FIG. 12 is a plan view of a hermetically sealed flexible photoflash lamp constructed according to this invention employing a mixture of solid reactants and utilizing existing elements within the lamp to form an internal battery.
Figure 13:
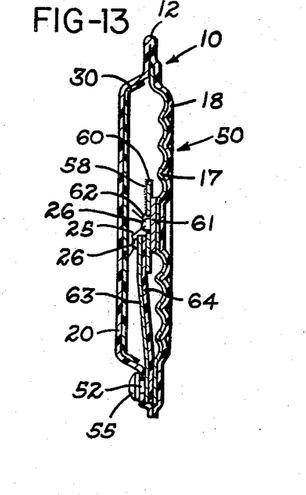
FIG. 13 is a cross sectional elevational view taken along line 13—13 in FIG. 12.
Figure 14:
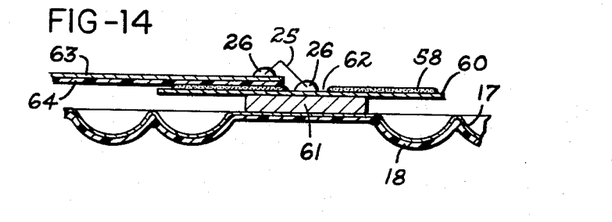
FIG. 14 is a cross sectional view taken along line 14—14 in FIG. 12.

FIGS. 12, 13 and 14 show another embodiment of this invention, similar to that shown in FIGS. 10 and 11, where the metal reflector and the disc supporting the solid reactants form elements of an integrated single use battery contained within the sealed envelope.

As can be clearly seen from FIG. 14, the reflector metal 17 comprises the anode of the internal battery while the foil reactant disc 60, which supports the solid reactants 58, comprises the cathode element. A porous medium 61 bearing electrolyte and cathodic material acts as a spacer and supports the main reactant disc 60, to which it is affixed by a pressure sensitive and electrically conductive adhesive. In the center of the reactant disc 60 is a space 62 where the igniting wire 25 and the associated explosive paste 26 are attached. The other end of the igniting wire 25, as shown in FIGS. 12 and 13, is attached to an electrical conductor 63 which extends to the exterior surface of the sealed envelope at 52. An insulating tape 64 separates the conductor 63 from the reflective surface 17. Also accessible through the opening 52 is a portion of the reflective surface 17 which acts as the second contact. Completing a circuit between the conductor 63 and reflector 17 at the opening 52 will then cause current to flow through the igniting wire 25 and initiate the light producing reaction.

The internal integrated battery of this invention may not only be located in the gas filled portion of the interior of the sealed envelope, as has been described, but may be positioned at any convenient location within the confines of the envelope structure. Thus, the integrated battery may be located on the back surface of the envelope or within the sealed edge portion.

Figure 15:
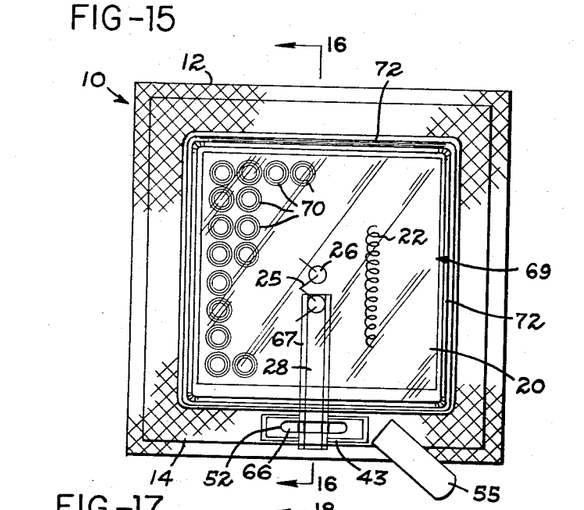
FIG. 15 is a plan view of a hermetically sealed flexible photoflash lamp constructed according to this invention employing a plurality of Fresnel lenses positioned adjacent the front inner surface of the envelope to direct the light in a preferred direction and which shows an integrated internal battery disposed in the edge portion of the envelope structure and utilizing the reflector element as one electrode of the battery.
Figure 16:
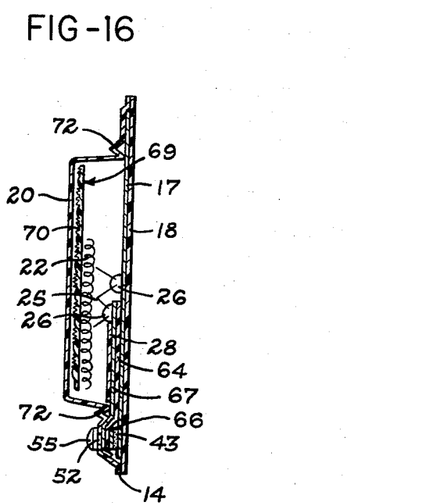
FIG. 16 is a cross sectional view taken along line 16—16 in FIG. 15.

As shown in FIGS. 15 and 16, a sealed flexible photoflash lamp 10 having a flat reflector surface 17 mounted on the container rear surface 18 forms one electrode for the integrated battery incorporated in this embodiment of the invention. A porous paper spacer 43 bearing the electrolyte and additive chemicals is located in the lower edge portion 14 of the envelope 10 and separates the reflector or anode element 17 from the cathode element 66. A portion of this cathode element is exposed through opening 52 in the front surface 20 of the envelope.

Partially covering the cathode element 66 and extending into the interior of the lamp is an insulator 64. A conductor 67 extends from the center of the interior portion of the lamp through the edge portion 14 and is also accessible through opening 52 but is insulated from both reflector surface 17 and the cathode element 66 by insulating strip 64. Conductor 67 is also insulated from the reactant wire 22 in the interior of the sealed envelope by another insulating strip 28. The integrated battery is therefore disposed completely within the edge portion 14 of the photoflash lamp utilizing the envelope structure 10 of the photoflash lamp as the container for the battery, and the reflector 17 as one electrode of the battery. The igniting wire 25 is connected between the conductor 67 and the reflector element 17 in the interior of the envelope. An explosive primer paste 26 is deposited at the points where the igniting wire is mounted to these elements, to ignite the main reactants which may consist of aluminum-magnesium alloy wire and oxygen gas.

In this embodiment, a flat reflector 17 is shown. In order to focus the light generated by the reactant wire 22, a refractive surface 69 is mounted against the front surface 20 of the envelope. The refractor 69 may be a thermoplastic sheet molded with a plurality of Fresnel type lenses 70 which project the light from the reaction outwardly in a preferred direction. The refractor 69 thus may serve as a spectrally selective filter, a light directing means, and an envelope protecting element. In addition, an air space 36 will be created between the front surface 20 and the refractor 69 which will provide additional insulation to aid in preserving the hermetic seal both during and after the brief light producing reaction. A sensitive expansion means in the form of a circumferential fold 72 surrounds the formed front surface 20 as shown in FIG. 15. Obviously, this circumferentially extending fold could also be included in any of the embodiments previously described.

In order to ignite the photoflash lamp shown in FIGS. 15 and 16, it is only necessary to complete the circuit between conductor 67 and cathode element 66. As described, both of these elements are accessible through the lower edge portion 14 through opening 52. In order to protect against inadvertent firing of the lamp by accidental contact with metal objects or other conductive materials, a protective insulating tape 55 is used to cover the opening 52 during storage of the lamp.

Figure 17:
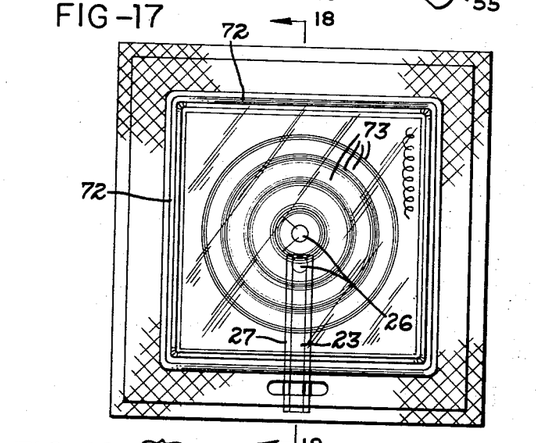
FIG. 17 is a plan view of another embodiment of the hermetically sealed flexible photoflash lamp of this invention employing a Fresnel lens type refractor element positioned adjacent the front inner surface of the lamp formed in series of concentric grooves or rings.
Figure 18:
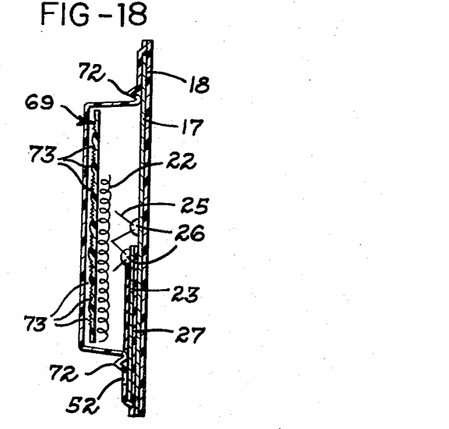
FIG. 18 is a cross sectional view taken along line 18—18 in FIG. 17.

FIGS. 17 and 18 illustrate another embodiment of this invention wherein the refractor element 69 is positioned adjacent the front inner surface of the envelope. A set of grooves 73 are concentrically arranged, as shown in FIG. 17, and function to direct the light emitted from the reactant wire 22 in a preferred direction. This is accomplished by forming the grooves into a Fresnel type lens in cross section, as shown in FIGS. 18 and 19, and positioning the reactant wire 22 in the focal plane of the Fresnel type lens so formed.

Although the embodiment shown in FIGS. 17 and 18 does not include an integrated internal battery, it is obvious that such battery could be incorporated, if desired, in view of the principles previously explained. In this embodiment, the igniting wire is connected to an external source of energy by conductor 23 which is insulated from the metallic reflector 17 by an insulating tape 27. One end of the igniting wire 25 is connected to conductor 23 while the other end is attached directly to the reflector 17. Explosive paste 26 is deposited at each point where the igniting wire is joined to the conductors. An opening 52 in the edge portion of the container exposes both a portion of conductor 23 and a portion of the reflector 17. By applying a current through these contacts, the ignition wire is heated and causes the explosive paste to initiate the high intensity light producing reaction.

Figure 19:
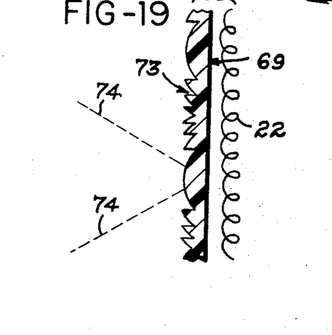
FIG. 19 is an enlarged cross sectional view of a portion of the Fresnel type refractor of FIG. 18 showing the light ray pattern formed during the light producing reaction.

FIG. 19 shows, on an enlarged scale, the light ray pattern which will be emitted from the reactants during the light producing reaction. By positioning the wire 22 at the focal plane of the series of Fresnel lenses 73, the light produced will be projected in a diverging solid conical shape pattern contained within the dotted lines 74. The solid angle of illumination may be controlled by varying the number and focal plane of the series of concentric lenses.

It should be emphasized that with respect to the embodiment shown in FIGS. 16–18, a flat reflector is used. With this type of configuration, a commercially available laminated material may be used for the rear surface of the container. This laminated material is formed from a paper layer, a thermoplastic layer, and a layer of metallic foil. The use of such laminated material for the back surface of the container envelope makes it possible to increase the support and stiffness of the photoflash lamp. In addition, the paper backing on the photoflash lamp may be utilized for printing instructions for use or photoflash guide members for the convenience of the user.

Thus, it is readily apparent from the foregoing description, an improved flexible photoflash lamp has been provided which eliminates the disadvantages found in the prior art lamps, such as poor form factor, tendency to shatter, and loss of gas reactant due to diffusion through the walls of the container and provides a compact, easy to carry, photoflash lamp which is safe, reliable and inexpensive.

While the forms of apparatus herein described constitutes preferred embodiments of the invention, it is to be understood that the invention is not limited to these precise forms of apparatus, and that changes may be made therein without departing from the scope of the invention which is defined in the appended claims.

What is claimed is:

1. A container for confining the products of a brief duration, light producing exothermic reaction comprising a flexible hermetically sealed container having a front wall at least a portion of which is transparent, and a rear wall, and formed to contain the reaction products, means forming a reflective surface positioned between the reaction products and said container rear wall, a transparent protective material positioned between said reaction products and said container front wall, both said reflective surface and said transparent material protecting the container from perforation by impact of the material reaction products and from destruction by the heat produced by the reaction to preserve the hermetic seal during and after the reaction, a plurality of indentations of parabolic cross section formed in said reflective surface, the locus of the foci of said parabolic indentations forming a plane which falls within said container, and planar positioned light producing means within said container having the median thereof coinciding with said plane to cause the light produced during the reaction to be projected in a preferred direction.

2. A single use photoflash lamp comprising a generally flattened, hermetically sealed thin thermoplastic envelope at least a portion of which is transparent, sensitive yieldable means on said envelope providing for volumetric changes in said envelope with changes in ambient atmospheric pressure for reducing to a minimum the diffusion of gases through said thin envelope, chemical light producing means contained within said envelope for producing an exothermic reaction resulting in a brilliant flash of light of short duration, and envelope protective means contained within said envelope having a transparent portion corresponding to the transparent portion of said outer envelope and positioned between said envelope and said light producing means for protecting said envelope from puncture by the reaction products and from destruction by the heat of the light producing means by absorbing the high peak value of the heat impulse generated by the exothermic reaction thereby causing the heat energy to be released over a more extended period of time at levels consistent with the physical properties of the envelope material to preserve the hermetic seal during and after the reaction, said envelope protective means consisting of a transparent heat ablative and insulating material positioned adjacent a front inner surface of said thermoplastic envelope and a reflective metal surface, said reflective surface being formed with a plurality of indentations of parabolic cross section, the focus of each parabolic indentation falling within said container and coinciding with the median of the planar positioned light producing means to direct the light produced by said reaction in a preferred direction.

3. A single use photoflash lamp comprising a generally flattened, hermetically sealed thin thermoplastic envelope at least a portion of which is transparent, sensitive yieldable means on said envelope providing for volumetric changes in said envelope with changes in ambient atmospheric pressure for reducing to a minimum the diffusion of gases through said thin envelope, chemical light producing means contained within said envelope for producing an exothermic reaction resulting in a brilliant flash of light of short duration, and envelope protective means contained within said envelope having a transparent portion corresponding to the transparent portion of said outer envelope and positioned between said envelope and said light producing means for protecting said envelope from puncture by the reaction products and from destruction by the heat of the light producing means by absorbing the high peak value of the heat impulse generated by the exothermic reaction thereby causing the heat energy to be released over a more extended period of time at levels consistent with the physical properties of the envelope material to preserve the hermetic seal during and after the reaction, said transparent portion of said envelope protective means including a refractor and a flat reflective surface, said refractor including a plurality of Fresnel lenses, the focus of each lens falling within said container and coinciding with the median of the planar positioned light producing means to direct the light produced by said exothermic reaction in a preferred direction.

4. The apparatus as defined in claim 3 wherein said transparent portion of said envelope protective means includes a spectrally selective filter to restrict the light emitted from said photoflash lamp to a particular desired range of colors.

5. A single use photoflash lamp comprising a thin flexible hermetically sealed generally flattened thermoplastic envelope having a front and rear surface, said envelope having sufficient strength to remain sealed after the gas contained within said envelope has expanded to its maximum volume, yieldable means on said envelope providing for volumetric changes of said envelope with changes in ambient atmospheric pressure to minimize the diffusion of gas contained within said sealed envelope to the ambient atmosphere prior to use, a chemical light producing means contained within said sealed envelope for producing, when ignited, a brilliant flash of light of short duration, envelope protective means, at least a portion of which is transparent, positioned between said front surface of said envelope and said light producing means for protecting said envelope from destruction by the heat and molten particles produced by said light producing means, and a metallic reflector positioned adjacent the rear surface of said envelope to direct the light produced by said light producing means in a preferred direction through said transparent portion, said metallic reflector formed with a plurality of concentric indentations of parabolic cross section, the focal plane of each parabolic indentation coinciding with the median of the planar positioned light producing means, wherein said plurality of concentric indentations of parabolic cross section comprises a bellows which functions as a sensitive yieldable means on said envelope to respond to atmospheric pressure changes.

6. A single use photoflash lamp comprising a thin flexible hermetically sealed generally flattened thermoplastic envelope having a front and rear surface, said envelope having sufficient strength to remain sealed after the gas contained within said envelope has expanded to its maximum volume, yieldable means on said envelope providing for volumetric changes of said envelope with changes in ambient atmospheric pressure to thereby minimize the diffusion of gas contained within said sealed envelope to the ambient atmosphere prior to use, a chemical light producing means contained within said sealed envelope for producing, when ignited, a brilliant flash of light of short duration, envelope protective means, at least a portion of which is transparent, positioned between said front surface of said envelope and said light producing means for protecting said envelope from destruction by the heat and molten particles produced by said light producing means, and a metallic reflector positioned adjacent the rear surface of said enveope to direct the light produced by said light producing means in a preferred direction through said transparent portion, said metallic reflector comprising a plurality of indentations each having a parabolic cross section formed in the rear surface of said envelope, the focal plane of each parabolic indentation coinciding with the median of the planar positioned light producing means.

7. A single use photoflash lamp comprising a thin flexible hermetically sealed generally flattened thermoplastic envelope having a front and rear surface, said envelope having sufficient strength to remain sealed after the gas contained within said envelope has expanded to its maximum volume, yieldable means on said envelope providing for volumetric changes of said envelope with changes in ambient atmospheric pressure to minimize the diffusion of gas contained within said sealed envelope to the ambient atmosphere prior to use, a chemical light producing means contained within said sealed envelope for producing, when ignited, a brilliant flash of light of short duration, envelope protective means, at least a portion of which is transparent, positioned between said front surface of said envelope and said light producing means for protecting said envelope from destruction by the heat and molten particles produced by said light producing means, and a metallic reflector positioned adjacent the rear surface of said envelope to direct the light produced by said light producing means in a preferred direction through said transparent portion, said transparent portion of said envelope protective means including a refractor formed from a plurality of Fresnel lenses, the focal plane of each Fresnel lens coinciding with the median of the planar position of the light producing means.

8. A container for confining the products of a brief duration, light producing exothermic reaction comprising a flexible hermetically sealed container having a front wall at least a portion of which is transparent, and a rear wall, and formed to contain the reaction products, means forming a reflective surface positioned between the reaction products and said container rear wall, a transparent protective material positioned between said reaction products and said container front wall, both said reflective surface and said transparent material protecting the container from perforation by impact of the material reaction products and from destruction by the heat produced by the reaction to preserve the hermetic seal during and after the reaction, said transparent portion of said envelope protective means including a refractor formed from a plurality of lenses, and planar positioned light producing means within said container having the median thereof coinciding with the focal points of said lenses to cause the light produced during the reaction to be projected in a preferred direction.

9. A photoflash lamp container for confining the material reaction products of a brief duration, light producing exothermic chemical reaction, including:
a flexible, hermetically sealed envelope;
means contained within said envelope for producing said light production reaction; and
a layer of siliceous material positioned between said sealed envelope and said means for producing said light producing reaction;
said silicate material protecting said sealed envelope from perforation by hot energetic material reaction products resulting from the ignition of said light producing means by mechanically shielding the sealed envelope from direct contact therewithin and from destruction by the heat generated by the exothermic reaction by causing the heat energy to be released over a more extended period of time at levels consistent with the physical properties of the envelope material thereby preserving the hermetic seal of said envelope throughout and following the reaction.

10. A photoflash lamp container for confining the material products of a brief duration, light producing exothermic reaction comprising:
a flexible hermetically sealed container having a front wall at least a portion of which is transparent, and a rear wall;
means within said container for producing said light producing reaction;
a metallic reflective surface positioned between the light producing means and said container rear wall; and
a transparent means formed from siliceous material positioned between said reaction producing means and said container front wall;
both said metallic reflective surface and said transparent means protecting said container from perforation by impact by mechanically shielding the container from direct contact with the energetic material reaction products and from destruction by the heat generated by the exothermic reaction by causing the heat energy to be released over a more extended period of time at levels consistent with the physical properties of the envelope material thereby preserving the hermetic seal of the container during and after the reaction.

11. The photoflash lamp defined in claim 10 including a single use battery contained within said sealed envelope and having circuit means closable from the exterior of said envelope for initiating said light producing reaction.

12. The photoflash lamp defined in claim 10 including a single use battery integrated within said sealed envelope having a circuit closable from the exterior of said envelope to initiate said light producing reaction with the resultant production of a brilliant flash of light of brief duration, said circuit including at least one conductor element accessible from the exterior of said envelope which forms one electrode of said battery.

13. The photoflash lamp defined in claim 12 wherein said metallic reflective surface forms an electrode of said single use battery.

14. The photoflash lamp defined in claim 12 wherein said light producing means consists of a mixture of solid reactants supported on a reactant disc, where said reactant disc forms one electrode of said single use battery, and where said metallic reflective surface forms the other electrode of said battery, a portion of said reflective surface being accessible from the exterior of said sealed envelope and which functions as one conductor in said circuit, said battery including a porous medium containing electrolyte separating said reactant disc and said metallic reflective surface.

15. A single use photoflash lamp comprising:
a generally flattened hermetically sealed thin thermoplastic envelope at least a portion of which is transparent;
sensitive yieldable means on said envelope providing for volumetric changes in said envelope with changes in ambient atmospheric pressure for reducing to a minimum the diffusion of gases through said thin envelope;
a reactant gas contained within said envelope at atmospheric pressure;
chemical light producing means contained within said envelope for producing an exothermic reaction resulting in a brilliant flash of light of short duration; and
envelope protective means of siliceous material contained within said envelope having a transparent portion corresponding to the transparent portion of said outer envelope and positioned between said envelope and said light producing means for protecting said envelope from perforation by the reaction products of the chemical light producing means and from destruction by the heat of the light producing means by absorbing the high peak value of the heat impulse generated by the reaction causing the heat energy to be released over a more extended period of time at levels consistent with the physical properties of the envelope material thereby preserving the hermetic seal during and after the reaction.

16. A single use photoflash lamp comprising:
a thin flexible hermetically sealed generally flattened thermoplastic envelope having a front and rear surface, said envelope having sufficient strength to remain sealed after the gas contained within said envelope has expanded to its maximum volume;
a chemical light producing means contained within said sealed envelope for producing, when ignited, a brilliant flash of light of short duration;
a reactant gas contained within said envelope at atmospheric pressure;
sensitive yieldable means on said envelope providing for volumetric changes of said envelope with changes in ambient atmospheric pressure to minimize the diffusion of said reactant gas contained within said sealed envelope to the ambient atmosphere prior to use;
envelope protective means of siliceous material, at least a portion of which is transparent, positioned between said front surface of said envelope and said light producing means for protecting said envelope from destruction by the heat and molten particles produced by said light producing means; and a metallic reflector positioned adjacent the rear surface of said envelope to direct the light produced by said light producing means in a preferred direction through said transparent portion.

17. The apparatus as defined in claim 16 including a single use battery contained within said envelope having circuit means closable from the exterior of said envelope for initiating the light producing reaction.

18. The apparatus as defined in claim 16 wherein said chemical light producing means includes a mass of fine metallic wire and the gas contained within said envelope consists of oxygen gas in sufficient quantity to entirely consume said mass of fine metallic wire when said wire is raised above a critical temperature.

19. The apparatus as defined in claim 16 wherein said chemical light producing means includes a mixture of solid reactants inert to the gas confined within said envelope, which gas possesses a low rate of diffusion with respect to the envelope material.

References Cited

UNITED STATES PATENTS

| 2,272,059 | 2/1942 | De Margitta | 67—31 |
| 2,289,876 | 7/1942 | De Margitta | 67—31 |
| 2,325,667 | 8/1943 | De Boer | 67—31 |
| 2,723,549 | 11/1955 | Martin | 67—31 |
| 3,220,225 | 11/1965 | Baird | 67—31 |

FOREIGN PATENTS

| 439,008 | 11/1935 | Great Britain. |
| 463,168 | 3/1937 | Great Britain. |

JAMES W. WESTHAVER, *Primary Examiner.*